United States Patent [19]

McDougall et al.

[11] Patent Number: 5,217,074
[45] Date of Patent: Jun. 8, 1993

[54] METHOD OF FRACTURING FORMATIONS

[75] Inventors: Lee A. McDougall; Fati Malekahmadi; Dennis Williams, all of Houston, Tex.

[73] Assignee: Exxon Chemical Patents Inc., Linden, N.J.

[21] Appl. No.: 784,532

[22] Filed: Oct. 29, 1991

[51] Int. Cl.$^5$ .......................................... E21B 43/267
[52] U.S. Cl. ................................. 166/300; 166/278; 166/308; 252/8.551
[58] Field of Search ............ 166/276, 278, 300, 305.1, 166/308; 252/8.551

[56] References Cited

U.S. PATENT DOCUMENTS

| | | | |
|---|---|---|---|
| 3,030,215 | 4/1962 | Veatch et al. | 501/33 |
| 3,163,219 | 12/1964 | Wyant et al. | 252/8.551 X |
| 3,948,325 | 4/1976 | Winston et al. | 166/308 |
| 4,202,795 | 5/1980 | Burnham et al. | 252/8.551 X |
| 4,506,734 | 3/1985 | Nolte | 166/300 X |
| 4,738,897 | 4/1988 | McDougall et al. | 252/8.551 X |
| 4,877,894 | 10/1989 | Huddleston | 252/8.551 X |
| 5,102,559 | 4/1992 | McDougall et al. | 166/308 X |
| 5,110,486 | 5/1992 | Manalastas et al. | 252/8.551 |

Primary Examiner—George A. Suchfield
Attorney, Agent, or Firm—Robert L. Graham

[57] ABSTRACT

Granules containing a gel breaker are used in a well treatment involving the use of a gelled fluid. The granules exhibit delayed release of the breaker to permit placement of the gelled fluid into the subterranean formation.

13 Claims, 2 Drawing Sheets

METHOD OF FRACTURING FORMATIONS

FIELD OF THE INVENTION

The present invention relates generally to the treatment of subterranean formations using gelled liquids. In one aspect, it relates to gelled fracturing fluids. In another aspect, the invention relates to the use of granules containing breaker chemicals in the fracturing and gravel packing operation. In still another aspect, the invention relates to the granules per se containing breaker chemicals.

DESCRIPTION OF THE PRIOR ART

Hydraulic fracturing has been widely used as a means for improving the rates at which fluids can be injected into or withdrawn from subterranean formations surrounding oil wells and similar boreholes. The methods employed normally involve the injection of a viscous fracturing fluid having a low fluid loss value into the well at a rate sufficient to generate a fracture in the exposed formation, the introduction of fluid containing suspended propping agent particles into the resultant fracture, and the subsequent shutting in of the well until the formation is closed on the injected particles. This results in the formation of a vertical, high-conductivity channels through which fluids can thereafter be injected or produced. The conductivity in the propped fracture is a function of the fracture dimensions and the permeability of the bed of propping agent particles within the fracture.

In order to generate the fracture of sufficient length, height, and width and to carry the propping agent particles into the fracture, it is necessary for the fluid to have relatively high viscosity. This viscosity in aqueous liquids is provided by the addition of polymers, frequently referred to as gelling agents. Following the treatment of the well, it is desirable to return the aqueous liquid to its low viscosity state, thereby permitting the fracturing fluid and polymer to be removed from the formation and the propped fracture. The highly viscous liquid, if left in the fracture, would impede the production of formation fluids through the propped fracture. Moreover, the residue of the polymer on the fracture face and in the pores of the propped fracture would significantly reduce fluid permeability therethrough.

To avoid these undesirable after effects of the polymer and polymer residue, it is now common practice to employ in the fracturing fluid chemicals ("breakers") which degrade the polymers. U.S. Pat. No. 4,741,401 discloses a number of oxidizing agents contained in capsules for breaking the fracture fluid. U.S. Pat. No. 3,938,594 discloses the use of sodium hypochlorite solution, acid, micellar solutions, and surfactants for degrading the fracturing fluid polymers. Other references describing breakers include U.S. Pat. Nos. 3,167,510; 3,816,151; 3,960,736; 4,250,044; 4,506,734; and 4,964,466.

As described in detail in SPE Paper 18862, published Mar. 13–14, 1989, some breakers in fracturing fluids for shallow low temperature (100 degree Fahrenheit) treatments are satisfactory for certain polymer gels. This paper further confirms that certain conventional breakers are not effective in fluids gelled with polymers crosslinked with organometallic compounds. For deep, high temperature (160 degrees Fahrenheit and above) wells, polymers crosslinked with organometallic compounds are generally employed as aqueous viscosifiers.

The organometallic crosslinkers were developed for high temperature service exhibiting excellent stability up to about 350 degrees Fahrenheit. Other crosslinkers, such as borate compounds, have an upper temperature limit of about 250 degrees Fahrenheit. Moreover, in deep high temperature wells, particularly wells at temperatures in excess of 160 degrees Fahrenheit, breakers that are not "delayed breakers" cannot generally be used because they tend to degrade the polymer prior to completion of fracture generation phase of the operation and/or placement of the proppant. Many of these breakers are pumped into the formation after placement of the fracturing because these breakers immediately start to degrade the viscosity enhancer in the fracturing fluid upon contact. In such cases, additional time and labor are needed to effect the reduction of the viscosity of fracturing fluids introduced into the subterranean formation. The use of organic breaker such as alkyl formate may alleviate this problem, since they can be applied along with the fracturing fluid. But these types of breakers rely on certain subterranean conditions, such as elevated temperature and time, to effect a viscosity reduction of the fracturing fluid. Since these organic breaker chemicals work on chemical change, such as hydrolysis, they are slow in effecting viscosity reduction. Furthermore, their performance can be unpredictable.

Accordingly, the incorporation of a breaker chemical into the fracturing fluid prior to the pumping of the fracturing fluid into the wellbore and well fractures is desirable. The breaker chemical must be in a passive, non-reactive state such that it cannot react with the viscous fluid of the fracturing fluid into the fractures, but the breaker chemical must be capable of reacting with the viscous fluid of the fracturing fluid within the fracture upon the completion of the fracturing process. The present invention teaches a method of accomplishing this objective.

In order to effect delayed reaction with the polymer used to gel the fracturing fluid, the breaker material is sometimes coated as described in U.S. Pat. Nos. 3,163,219; 4,506,734; and 4,741,401 and application Ser. No. 637,401, filed Jan. 4, 1991 (now U.S. Pat. No. 5,102,558). The encapsulation adds to the expense. Moreover, the coating of small particulates is difficult. U.S. Pat. No. 3,163,219 also discloses the use of water-soluble or oil-soluble binders that are dissolved in the fracture; and U.S. Pat. No. 4,202,795 discloses pellets containing a mixture of hydratable gelling agent (e.g., guar gum) and a breaker for that gelling agent.

SUMMARY OF THE INVENTION

The method of the present invention involves the use of agglomerated particles referred to as granules containing a gel breaker which are introduced into a well treating fluid and function as delayed breakers in well treating operations. The granules exhibit a delayed release of the active chemical (gel breaker) so the degradation of the polymer occurs well after the fracturing fluid or gravel packing fluid has been pumped into the formation. Moreover, the breakers are effective within reasonable time periods so that long shut-in times are not required.

The granules comprise 40 to 90 percent of a solid (particulate) breaker compound (preferably an oxidizer), from 10 to 60 percent of an inorganic powdered binder such as clay, and a small amount of an organic binder/processing aid. The powdered binder preferably is made up of a mixture of clay, talc and infusorial earth such as diatomaceous earth.

In the preferred embodiment of the invention, the granules contain a major percentage of the breaker compound such as sodium persulfate or ammonium persulfate. This high concentration of the breaker chemical coupled with inorganic clays, or mixtures containing clay, surprisingly results in a delayed release of the breaker compound thereby permitting the well treating operation to be completed before the gel is broken. The breaker is activated by the well treating fluid dissolving the soluble breaker. As more and more of the breaker is dissolved, the particles disintegrates exposing more of the breaker compound to the liquid.

As mentioned above, the granules containing the breaker are introduced directly into the gelled well treating fluid as the fluid is pumped from the surface to and into the subterranean formation. The granule sizes of the particles containing the breaker are ideally suited for fracturing and gravel packing operations, ranging from 10 to 80 mesh (U.S. Sieve Series), more preferably from 12 to 60 mesh, and most preferably from 20 to 40 mesh. The breaker may be incorporated into the frac sand or gravel slurry or into the fluid without the frac sand or gravel (e.g., pad fluid).

DESCRIPTION OF THE PREFERRED EMBODIMENTS

Figure 1:
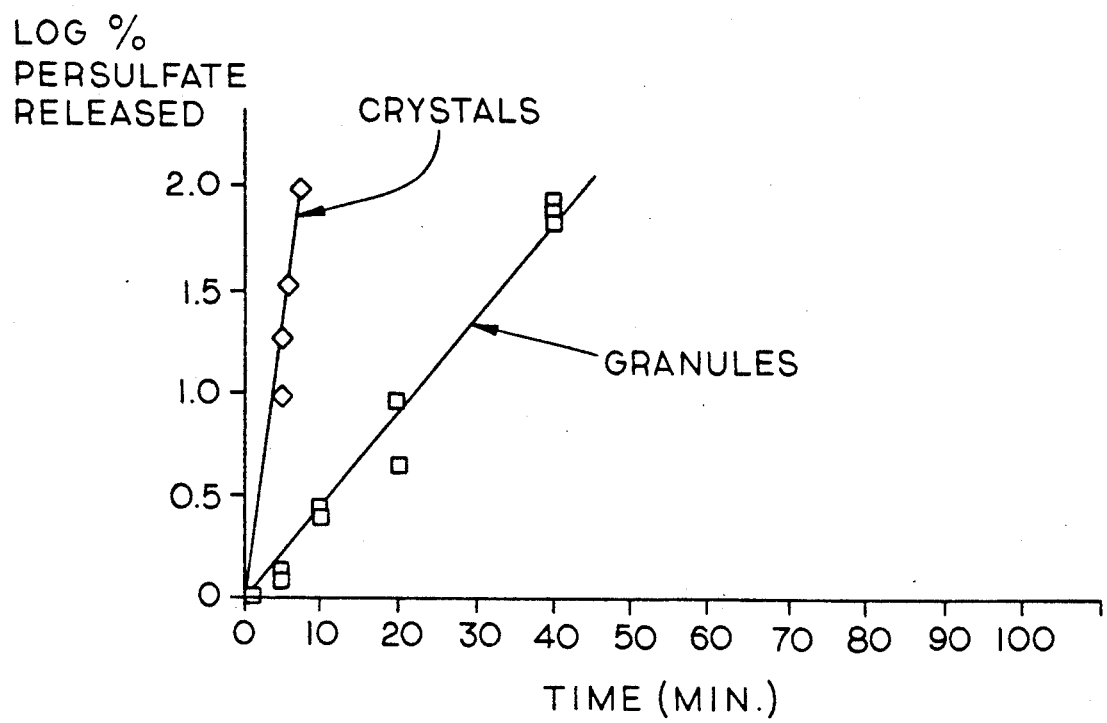
FIGS. 1, 2 and 3 are plots comparing the delayed release of breaker chemical from the granules with that of ungranulated breaker crystals.

The granules useful in the present invention are agglomerates of two main powdered (finely divided) particulates: a breaker compound and inorganic binder. For clarity of description, the agglomerated particles are referred to herein as "granules" and the constituent particulates are referred to merely as particles or powder. The main components of the granules, the method of manufacture and method of use are described in detail below.

Breaker Compound: Specific examples of preferred breaker compounds of the instant invention are selected from the group consisting of ammonium and alkali persulfates, alkyl formates, salicylates, acetates, chlorites, phosphates, sulfamic acid, laureates, lactates, chloroacetates, enzymes and other solid breakers. These solids are available in particulate form and are capable of being granulated or agglomerated to form delayed breaker granules.

The preferred breakers are the crystalline particulates such as sodium persulfate and ammonium persulfate. It should be noted that sodium persulfate and many of the particulate breakers are too small in particle size (generally smaller than 100 mesh) for effective coating by the prior art techniques. Moreover, such particles present handling problems since they are so tiny. Also, the crystalline forms of these solids are generally angular which also contributes to difficulties in handling and encapsulating.

The chemical breaker solids may be used per se in the agglomeration process to form the granules or, in other embodiments, may be deposited on or in a particle which functions as a core, seed, or carrier for the breaker in the agglomeration process. For example, the breaker chemical may be sprayed as a solution or in liquid form onto small, finely divided seed particles to form a coating on or in these seed particles. Essentially, any solid which is of the proper size and which is inert to the breaker chemical (or other active material) may be used as the seed, core, or carrier particle, but urea is preferred. This embodiment is especially preferred where the breaker chemical is itself a liquid.

By way of another example, the breaker chemical can also be used in a carrier particles with a solid polymeric matrix as described in U.S. Pat. No. 4,738,897 (incorporated herein by reference), or absorbed on or in a porous solid such as diatomaceous earth or coated on an inert core substrate such as urea as described above.

In another embodiment of this invention, the agglomerated granules containing breaker chemical, with or without a seed, core or carrier may be overcoated or encapsulated with a thermoplastic polymer material. The preferred coating or encapsulation is as described in U.S. patent application Ser. No. 637,401, now U.S. Pat. No. 5,102,558, filed Jan. 4, 1991, the disclosure of which is incorporated herein by references.

For purposes of the present invention the term chemical breaker compounds refers to the constituent particles (e.g., crystals, core, seed, carrier) in the agglomerated granules.

The preferred breaker chemicals for use in the present invention include oxidizers such as ammonium persulfate, sodium persulfate, potassium persulfate, sodium chlorite, ammonium bifluoride, ammonium fluoride, sodium fluoride, potassium fluoride, sulfamic acid, citric acid, oxalic acid, ammonium sulfate, sodium acetate and enzymes and mixtures thereof.

The preferred oxidizer are the persulfates (sodium and ammonium) which are commercially available. Sodium persulfate, for example, is available in crystalline form (average particle size between 150 to 50 microns) and are typically available in 85%-95% pure form. Each granule used in the present invention contains at least 3 particles, and preferably from 5 to 30 particles, of the breaker compound, and most preferably 8 to 15 particles.

Binders: The binder must be chemically nonreactive with the well treating fluid and the breaker compound. The preferred binders are powdered inorganic binders which are classified as nonchemical or inert binders (i.e., they do not react with the constituent particles to achieve agglomeration).

The inorganic powdered binder functions to bind the particulate breaker compound together and increase the strength and integrity of the granules. The powdered binder, also, provides a microporous matrix for conducting the carrier liquid (e.g., water) by capillary attraction to the interior of the granule thereby enabling the liquid to contact the breaker compounds. Therefore, the dissolution of the breaker is by contacting the granule surface and/or interior.

Because its availability and effectiveness in granulation, clay is the preferred binder for use in the present invention. The term "powdered" or "powder" means tiny particles having an average particle size of 10 to 50 microns, preferably 20 to 40 microns. Clays (bentonite and attupulgate) are easily wet by water and are capable of being granulated with high levels of breaker compounds to form relatively strong granules of the proper size for use in well treating operations.

In serving as the binder, the clay particles develop agglomeration forces by surface tension of the water present, adhesion forces, and electrostatic forces. Other inorganic binders include sodium silicate, colloidal alumina, colloidal silica, fullers earth, and the like.

In addition to the principal binder, other particulate additives which improve the strength and function of the granule or aids in the processing may be used. Talc, which is magnesium silicate hydrate, functions as a binder and as a solid lubricant in the granulation process.

Infusorial earth (e.g., diatomaceous earth) appears to improve the strength of the granules. Infusorial earth is a powder which is capable of holding four times its weight in water. Although it is not fully understood why the presence of infusorial earth improves the performance of the granules, it is believed that the high uptake of water ties up and distributes the water throughout the granule, and thereby stabilizes the granules. Infusorial earth includes siliceous earth, diatomaceous earth, fossil flour, celite, kieselguhr, and the like.

It is necessary that the mixture of particles comprising the granules include a small amount of an organic binder/processing aid. The organic binder serves as a processing aid in the granulation process and as a binder in the final granule. Because of hazards involved in the granulation process, it is necessary that the organic material selected as the binder/processing aid be substantially non-oxidizable. The non-oxidizable character also increases the shelf life of the granules. Polyvinyl pyrrolidone (PVP), polyvinyl alcohol, a thermoplastic resin, or thermosetting resin are substantially non-oxidizable and therefore preferred.

Manufacture of the Granules: The granules useable in the present may be agglomerated by a variety of well known processes including granulation, pelletizing, briquetting, and the like.

The preferred method of agglomerating the particles and powders into granules is by low pressure granulation. Granulation is defined as the formation of small particles called granules by growth agitation. In this process, particles of the breaker compound and binder powder are moistened and intimately mixed. The substantially homogeneous mixture is extruded at low pressure (e.g., below 100 psig) through screen openings forming cylindrical extrudate pellets which are then subjected to spheronization treatment to reform them into generally spherical or rounded shapes. Low pressure granulation avoids the hazards of decomposing the unstable persulfates.

Briefly, the extrusion phase of the granulation process involves introducing a mixture of the breaker particles and binder powder wet with about 1 to 30, preferably 5 to 25, most preferably 5-10 percent water (based on the weight of the mixture) into an extruder hopper. The moist mixture is fed into the feed zone of an auger-like screw extruder which mixes and kneads the mixture to disperse the solids uniformly into a moist generally homogeneous mass. The screw auger transfers the mass to the compression zone of the extruder where the particles are compacted together, forcing air out of the voids. (Separate mixing augers and compression augers may also be used.)

The compacted moist mass is then forced or extruded radially through a screen forming generally cylindrical pellets which may be separated from the extrudate by breaking off by gravity, or by a blade which separates the extrudate from the screen.

The generally cylindrically shaped pellets are not suitable for handling or for use in well treating operations. The extrudate pellets are therefore subjected to spheronizing which may be as follows: The damp extrudate pellets are fed into equipment referred to as a spheronizer, where they are reshaped or deformed into well rounded or spherical shapes. The pellet deformation may be carried out in a rotating bowl with a friction plate. The pellet collisions with each other and with the wall and contact with the friction plate imparts kinetic energy to the pellets which gradually reform the pellets into generally spherical shape. The granulation of powdered granules is described in detail in an article "EXTRUSION AND SPHERONIZING EQUIPMENT" by Douglas C. Hicks, presented at a seminar sponsored by The Center for Professional Advancement on Apr. 24-26, 1989 in Princeton, N.J. The disclosure in this article is incorporated herein by reference.

Following granulation, the rounded granules may be screened for sizing and are dried to remove the water and thereby provide for sufficient storage time before use.

Although granulation, as described above, is the preferred process of manufacturing process, other agglomeration processes may be used. These include pelletizing, fluid bed granulating, pan or drum granulating, and briquetting. Tests have shown, however, that the low pressure extrusion granulation produces moderately strong granules possessing a balance of strength to (a) endure the rigors of handling and pumping and (b) release of the soluble breaker compound upon contact with the fracturing fluid. The high pressure agglomeration processes are expensive and produce agglomerates which may be not release the breaker compound within the time constraints of a fracturing operation or other well treating operation.

As mentioned above, the mixture of particles that are agglomerated into granules may include primarily the breaker chemical solids, clay particles, and an organic binder/processing aid.

Preferably, however, the dry mixture granulated will be as follows:

|  | PREFERRED WT % | MOST PREFERRED WT % |
| --- | --- | --- |
| Breaker Chemical Compound | 40-90 | more than 50 to 85 |
| Binder powder |  |  |
| Clay (at least 40% of the binder) | 8-58 | 10-30 |
| Talc | 0-10 | 3-10 |
| Infusorial Earth | 0-10 | 2-10 |
| Organic Binder/Processing Aid | 0.1-2.0 | 0.2-1.0 |

For use in the method of the present invention, the granules, preferably should exhibit the following properties:

| Particle Size | 10 to 80 mesh |
| --- | --- |
| Strength or Hardness (particle crush strength*) | about .5 to about 16 pounds |
| S.G. (particle) | 2.0-3.0 |
| Delayed Release Time | reduction of 2 to 20 (most preferably 2-15) times vis-vis ungranulated crystals. |

*Penwalt Stokes Hardness Tester (U.S. Pat. No. 2,041,869)

OPERATION

In carrying out the method of the present invention as applied in hydraulic fracturing operations, a subterranean formation is fractured using conventional equipment and fluids and processes. Typical fracturing fluids include water-based brine fluids containing a water-soluble polymer such as hydroxypropyl guar crosslinked with a transition metal salt as is well known in the art. Other polymers used to viscosify aqueous fracturing fluids are guar gum hydroxyethyl cellulose, polyacrylamide, gum karaya and the like. In addition, fracturing fluids may be viscous oils or oil-based emulsions as x-linked gelled forms or liquid gel forms. Viscosification of these is accomplished via addition of surfactants, aluminum alkyl phosphates, asphalts, fatty-acid soaps, other emulsion and foam stabilizing agents and the like.

Typical propping agents used in hydraulic fracturing for retaining the integrity of the fractures are sand, sintered ceramics (e.g., sintered bauxite), resin coated sand or combinations having a particle size between 10 to 80 mesh. The concentration used depends on the size and shape of the proppant, the type of formation being fractured, the carrying capacity of the fracturing fluids and the desired permeability of the resistant fractures. The concentrations generally range from 1 to 30 pounds per 1000 gallons.

Other additives commonly used in hydraulic fracturing fluids are fluid loss or wall building agents such as starch, bentonite, silica flour, guar gum and surfactants; friction-reducing agents such as small amounts of high molecular weight linear polymers such as polyacrylamide; specific gravity increasing agents; bactericides; scale-removal/prevention agents, and surfactants or alcohol to reduce interfacial tension and the resistance to return flow.

The granules containing the chemical breaker may be employed in the gelled fracturing fluid. The concentration of the granules should be sufficient to provide the fracturing fluid with from 0.1 to 20 pounds per 1000 gallons of the fracturing fluid. Preferably, from 1 to 15 pounds, and most preferably, from 2 to 10 pounds of granules are used per 1000 gallons of fracturing fluid.

The process of the present invention may be carried out at formation temperatures between 80 degrees Fahrenheit and 225 degrees Fahrenheit, preferably at high temperatures (above 140 degrees Fahrenheit). For low temperatures, the fracturing fluid may include an activator such as triethanolamine as taught in U.S. Pat. No. 4,250,044 for persulfates to accelerate the activation of the breaker, the disclosure of which is incorporated herein by reference.

Following the pumping operation, the well is shut in permitting the fracturing fluid in the fracture to bleed off and the fracture to collapse on the proppant. After a sufficient period of time, to permit a portion of the breaker chemical to be dissolved in the fracturing fluid or formation, the well is back flowed. The degradation of the polymer by the action of the breaker chemical reduces the viscosity of the fracturing fluid permitting the fluid to be withdrawn from fracture by the back flowing operations. The granules as dissolution proceeds disintegrate, exposing more of the breaker chemical to the fracturing fluid.

EXAMPLES

Iodometric titration tests were carried out to demonstrate the delayed release of the breaker chemical in an aqueous medium. These tests compared the release of sodium persulfate crystals with the release of granules containing sodium persulfates at three pH's: 10, 7, and 4.

The crystals were obtained from FMC Corporation; and the granules contained:

|  | AVG. WT % |
|---|---|
| Sodium Persulfate | about 75 |
| Powdered Binder (Clay, Talc, Diatomaceous Earth) | about 24 |
| Organic Binder (PVP) | about .5 to 1.0% |

The titration tests involved preparing bottle samples containing a buffer and KI solution. The pH of each sample was adjusted to the test conditions (4, 7, or 10) and one gram of the ungranulated crystals or 1 gram of the granules were added to a bottle sample. Each sample was titrated with 0.1N sodium thio sulfate until color changed from reddish yellow to clear. Titrations were performed on each sample at the following typical time intervals: 1 min., 5 min., 10 min., 20 min., 40 min., 60 min., and 80 min. The bottle samples were weighed before and after titration to determine titrate used from which the amount of sodium persulfate in solution was calculated. Replicate samples were tested at each condition.

During the tests, the granules were observed to disintegrate as dissolution of the sodium persulfate proceeded.

Figure 2:
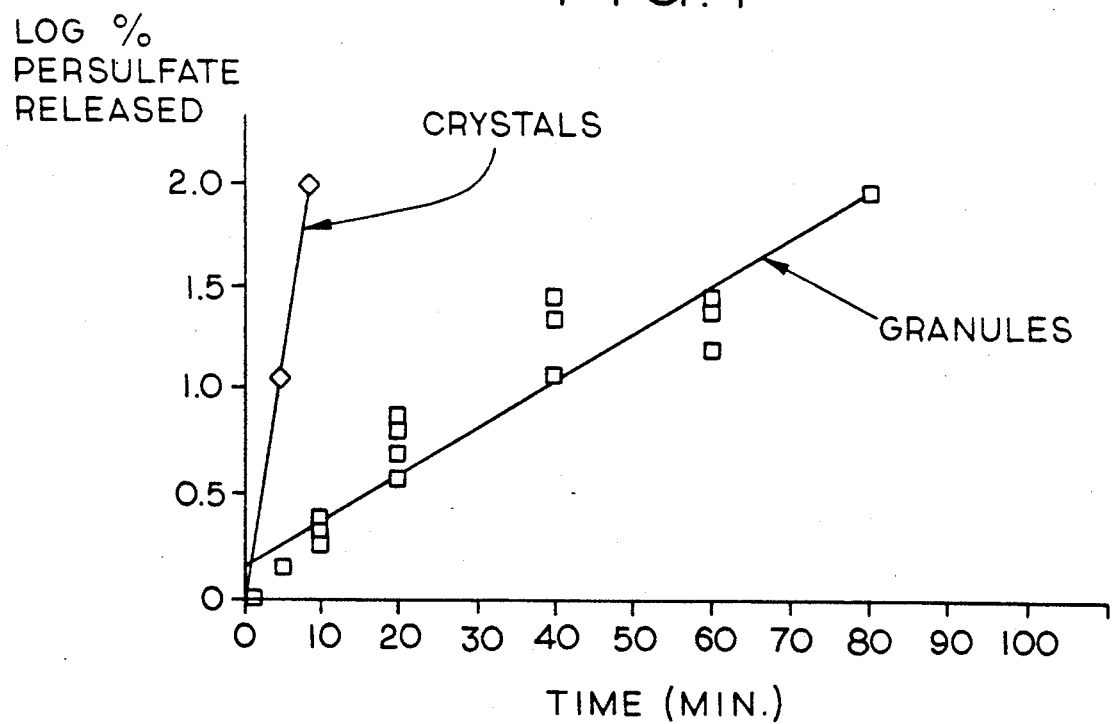
Figure 3:
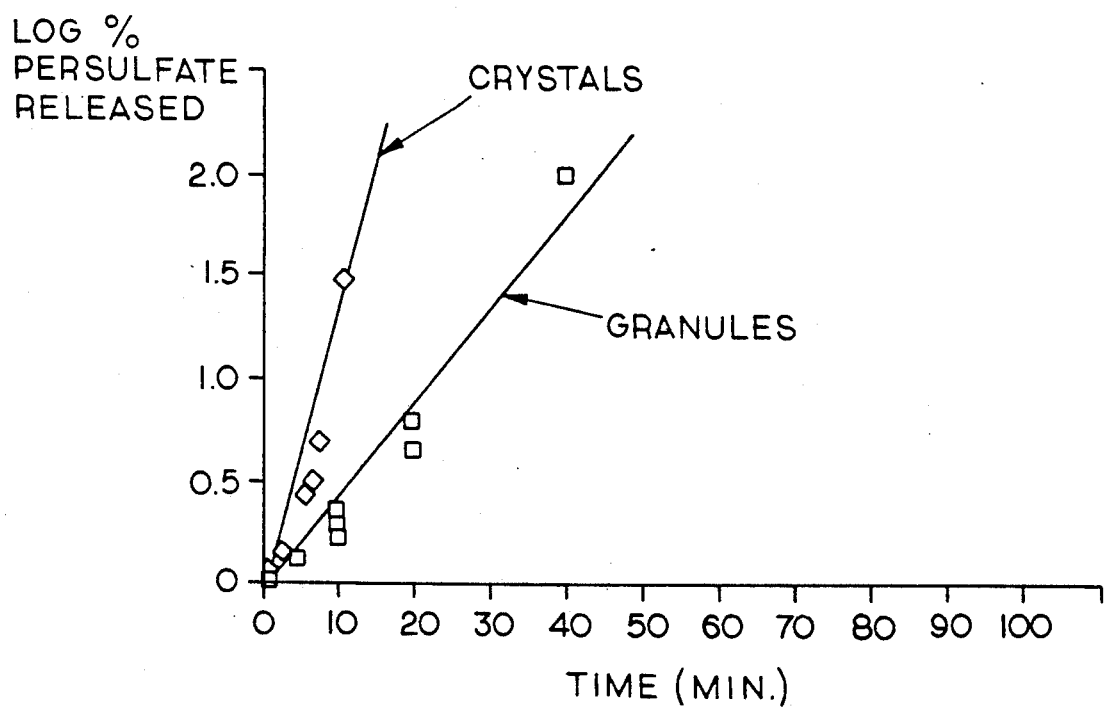

The test results are presented in TABLE I and graphically illustrated in FIGS. 1, 2, and 3 for pH's of 7, 10, and 4, respectively.

TABLE I
RELEASE RATE OF SODIUM PERSULFATE BREAKERS

| FORM OF BREAKER | pH | LOG % PERSULFATE RELEASE PER MINUTE (1) | NORMALIZED RATE (2) |
|---|---|---|---|
| Crystals | 4 | 0.120 | 5.22 |
| Granules | 4 | 0.049 | 2.13 |
| Crystals | 7 | 0.264 | 11.5 |
| Granules | 7 | 0.049 | 2.13 |
| Crystals | 10 | 0.244 | 10.6 |
| Granules | 10 | 0.023 | 1.00 |

(1) Percent Persulfate Released is the amount of persulfate released at a given time divided by the total persulfate released expressed as a percentage.
(2) Rates Normalized to slowest rate, granules at pH = 10.

As illustrated in the plots of FIGS. 1, 2, and 3, the granules delayed release of breaker by several fold. The data in TABLE I reveals that the granules reduced breaker release by about 2½ times (pH of 4), by about 5 times (pH of 7), and by about 10 times (pH of 10) compared to the ungranulated crystals under the same conditions.

In order to demonstrate the effectiveness of the granules containing breaker compound, tests simulating fracturing treatment were carried out. The materials used in the simulation were:

Fracturing Fluid: Water gelled with 40 pounds guar/1000 gallons KCl (pH 10)
Proppant: 20/40 mesh Carbo-Lite proppant
Breaker: 25/80 mesh granules with 75% sodium persulfate.

During a fracturing fluid simulation, the base gel was fed to an open blending device by the Moyno Pump where the fluid was stirred with a ribbon-shaped stirring device. At this point, the breaker (2.0 lb of granules per 1000 gal of water) was added to the base fluid prior to the intensifier pumps. The crosslinking was accomplished by adding 2 gal/1000 gal of a borate source equivalent to 0.8 lb/1000 gal boron with a high pressure metering pump on the high pressure side of the intensifier system.

The fluid proceeded from the intensifier pumps to a length of ¼ inch tubing where it was sheared at a shear rate near 1000/sec for 5 minutes to simulate pumping down tubing at 12 BPM. The fluid then entered a length of 1 inch tubing surrounded by a heating jacket to simulate the formation. The shear rate was 40-50/sec while undergoing heat-up to the temperature used for the fluid loss simulation. A temperature of 100 degrees Fahrenheit was selected to represent the average cooldown temperature of a point within 50 feet of the wellbore in formations with a BHT of 160 degrees Fahrenheit. Residence time in the formation simulator was approximately 5 minutes.

Once the fluid was heated at a shear rate of 40-50/sec, it flowed through the test cell, again at a shear rate of 40-50/sec. Flow was between two approximately ⅜ inch slabs of Ohio Sandstone core that had been saturated with 2% KCl. The leakoff rate through each core was monitored vs time. The fluid traveled to a series of high pressure knock-out pots where the fluid was collected and dumped while maintaining a constant pressure of 1000 psi on the system.

A complexed gel pump time of 60 minutes was performed on all reported tests. The time was divided into the following stages:

| STAGE | FLUID | TEST |
|---|---|---|
| 1 | 2% KCl | 10 min. |
| 2 | Base Gel | 10 min. |
| 3 | Complexed Gel Pad | 60 min. |
| 4 | Slurry to pack cell to desired concentration | |

The amount of proppant was selected to obtain 2 lb/sq.ft. in the ⅛ inch slot. The final slurry was flowed into the cell and the cell shut-in. The pipe-to-slot flow ends were removed and replaced with the inserts containing a ⅛ inch hole with a filter screen to confine proppant to the cell during closure. The top piston set-screws and spacers were removed and an increasing closure pressure was applied while heating to the test temperature of 160 degrees Fahrenheit and monitoring leakoff. A closure pressure of 1000 psi was achieved over the course of 100 minutes.

Fluid was leaked off until a net cell pressure of zero was obtained (closure-internal cell pressure=0). At this point, the cell was shut-in at temperature and allowed to set static for 12 hours. After 12 hours, 2% KCl flow was initiated through the core and the pack simulating flowback while closure was slowly increased to 2000 psi, according to the test parameters. Fluid was flowed alternately through the core and the pack for 24 hours. Thereafter, conductivity and permeability of the pack was monitored vs time for 50 hours.

The data is presented in TABLE II.

TABLE II

| HOURS AT CLOSURE & TEMPERATURE | CLOSURE (psi) | TEMP DEG F. | CONDUCTIVITY (md-ft) | WIDTH (in) | PERMEABILITY (Darcies) |
|---|---|---|---|---|---|
| −24 | 1000 | 100-150 | Leakoff while heating & breaking | | |
| −18 | 1000 | 150 | — | 0.229 | — |
| −6 | 1000 | 150 | — | 0.227 | — |
| 0 | 2000 | 150 | 7231 | 0.225 | 386 |
| 10 | 2000 | 150 | 6507 | 0.224 | 349 |
| 20 | 2000 | 150 | 9142 | 0.223 | 492 |
| 30 | 2000 | 150 | 9590 | 0.223 | 516 |
| 40 | 2000 | 150 | 9670 | 0.223 | 520 |
| 50 | 2000 | 150 | 9670 | 0.223 | 520 |

Note: 50 hour KCl Retained Permeability = 520/567 92%

The TABLE II data indicated that the breakers were effective in reducing the viscosity of the fracturing fluid and achieving 92% of the conductivity of the proppant packed fracture.

Additional tests were carried out in a rheology simulator to determine whether or not the delayed release of the breaker from the granules used in the experiments described above was sufficient to permit placement of the viscosified fracturing fluid in the formation.

The base gel was pumped to the blender where marker proppant, 20/40 sand, and breaker were added. The slurry was then pumped with a triplex pump through 0.899 inch coiled tubing at 15 gal/min (1300 1/sec) to the choke table where it is split to load the formation simulator at 5 gal/min (196 1/sec). The residence time in the tubing simulator was 2.5 min and the bath temperature was 85 degrees Fahrenheit. Once the formation simulator was loaded, the intensifier pump was shut down. The test gel was displaced through the rheometer by a small triplex pump. A low rate, 0.5 to 1 gal/min, was maintained through mots of the test. The temperature of the fluid coming out of the formation simulator was adjusted to 150 degrees Fahrenheit initially and rampled to 160 degrees Fahrenheit during the test to give the desired temperature range. The rheology was determined with a 4-pipe sequential rheometer. The fluid first entered 20.474 ft of 0.93 inch ID tubing and then 13.533 ft of 0.807 inch ID pipe, 11.021 ft of 0.674 inch ID tubing and, finally, 6.291 ft of 0.615 inch ID pipe. Each pipe had two DP-15 Validyne pressure transducers. The test fluid then goes through a mass flow meter where rate and density are recorded, and on to the slot, where the test is video taped. The rate was measured with a Micro-Motion D-40 mass flow meter. The 8 dP's, temperature, density, and rate were routed to a Validyne MCI-20 signal conditioner then to a Validyne DA-380. The data was then sent to a IBM-PC where it was stored on disk for later use.

These tests indicated that the fracturing fluid retained its viscosity after 37 minutes, which for most operations is sufficient to complete pumping of the gelled fracturing fluid.

The breaker should delay degradation of the gel for at least 30 minutes, preferably 60 minutes, and should complete the release (by dissolution) of the breaker within 360 minutes. "Complete release" is defined where at least 99% of the breaker has been dissolved and diffused into the surrounding fracturing fluid. The above tests demonstrate that the granules exhibit (a) sufficient reaction to permit safe placement of the proppant and (b) sufficient release of the breaker to effect degradation of the gel and provide at least 90% of the retained propped permeability (i.e., permeability without gel).

OTHER EMBODIMENTS

While the present invention has been described with specific reference to gelled aqueous fracturing fluids, it will be appreciated by those skilled in the art that the principles embodied in the present invention will have applications in any well treating operation where a gelled fluid is pumped into a subterranean formation and is degraded within a relatively short period of time to remove the gelled fluid and improve or restore the conductivity or permeability in the formation. Two such well treating operations are fracturing and gravel packing. Also, the method can be used with water-base or oil-base fluids, with the former being preferred.

What is claimed is:

1. In a method for treating a subterranean formation wherein a fluid gelled with a polymeric gelling agent is injected through the wellbore and into the subterranean formation, the improvement wherein the fluid contains agglomerated granules having an average particle size between 10 to 80 mesh, said granules comprising from 40 to 90 weight percent of a particulate chemical breaker compound capable of degrading the polymeric gelling agent, from 8 to 58 wt % of an inert inorganic binder powder, and from 0.1 to 2 wt % of an organic binder/processing aid.

2. The method of claim 1 wherein the gelled fluid is an aqueous fracturing fluid.

3. The method of claim 2 wherein the chemical breaker compound is an oxidizing agent capable of degrading the polymeric gelling agent.

4. The method of claim 2 wherein the oxidizing agent is a persulfate.

5. The method of claim 2 wherein in granules comprise more than 50 wt % of the particulate chemical breaker compound.

6. The method of claim 2 wherein the granules are made by low pressure granulation.

7. The method of claim 1 wherein the granules each have a crushing strength of 0.5 to 16 pounds.

8. A method of fracturing a subterranean formation which comprising
    (a) injecting into the formation an aqueous fracturing fluid viscosified with a polymeric gelling agent at sufficient rate and pressure to form a vertical fracture therein;
    (b) injecting into the fracture additional fracturing fluid containing a mixture of a propping agent and granules having an average particle size of between 10 to 80 mesh and comprising an agglomeration of particles of particulate oxidizing agent, particles of an inert inorganic powder, and an organic binder/processing aid; said oxidizing agent being water soluble and capable of degrading the gelling agent;
    (c) permitting the fracturing fluid to dissolve a portion at least of the oxidizing agent to degrade the gelling agent thereby reducing the viscosity of the fracturing fluid; and
    (d) backflowing the degraded fracturing fluid to the surface.

9. The method of claim 8 wherein the oxidizer is a persulfate oxidizer having an average particles size of between 50 to 150 microns and the binder powder includes clay.

10. The method of claim 9 wherein the granules contain a major wt % of the persulfate oxidizer and a minor wt % of the binder powder.

11. The method of claim 8 wherein the granules have a time release property in an aqueous medium wherein 99% of the oxidizer is released from the granule between 30 minutes and 360 minutes after introduction into the fracturing fluid.

12. The method of claim 8 wherein the granules are present in the fracturing fluid at a concentration of 0.1 to 20 pounds per 1000 gallon.

13. In a method for treating a subterranean formation wherein a fluid gelled with a polymeric gelling agent is injected through a wellbore and into the subterranean formation, the improvement wherein the fluid contains agglomerated granules having an average particle size between 10 to 80 mesh, said granules comprising from 40 to 90 weight percent of a particulate chemical breaker compound capable of degrading the polymeric gelling agent, from 8 to 58 wt % of clay, from 0 to 10 wt % talc, from 0 to 10 wt % infusorial earth, and from 0.1 to 2 wt % of an organic binder/processing aid.

* * * * *